(12) United States Patent
Tanikawa

(10) Patent No.: US 7,334,139 B2
(45) Date of Patent: Feb. 19, 2008

(54) POWER SUPPLY CONTROL APPARATUS, POWER SUPPLY CONTROL SYSTEM, AND ADMINISTRATION APPARATUS

(75) Inventor: Akinao Tanikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 11/012,245

(22) Filed: Dec. 16, 2004

(65) Prior Publication Data

US 2005/0144489 A1 Jun. 30, 2005

(30) Foreign Application Priority Data

Dec. 25, 2003 (JP) .............................. 2003-428918

(51) Int. Cl.
G06F 1/00 (2006.01)
G06F 1/26 (2006.01)
G06F 11/30 (2006.01)

(52) U.S. Cl. ...................... 713/300; 713/320; 713/330; 713/340

(58) Field of Classification Search ................. 713/300
See application file for complete search history.

(56) References Cited

U.S. PATENT DOCUMENTS 5,949,974 A * 9/1999 Ewing et al. ............... 709/202

FOREIGN PATENT DOCUMENTS

| JP | 07-030565 | 1/1995 |
|---|---|---|
| JP | 08-320742 | 12/1996 |
| JP | 10-051979 | 2/1998 |
| JP | 10-275124 | 10/1998 |
| JP | 2000-078224 | 3/2000 |
| JP | 2000-163164 | 6/2000 |
| JP | 2001-134545 | 5/2001 |
| JP | 2002-207538 | 7/2002 |

* cited by examiner

Primary Examiner—Rehana Perveen
Assistant Examiner—Stefan Stoynov
(74) Attorney, Agent, or Firm—Staas & Halsey LLP

(57) ABSTRACT

A system performs the power supply control of a plurality of information processing apparatuses at a low cost without relation to the intrinsic function of the information processing apparatus and the existence of a network facility. The power supply control apparatus of the present invention can be connected to at least one information processing apparatus. The power supply control apparatus comprises a power supply circuit that supplies electrical power to the information processing apparatus, a network connecting unit that connects a network with an administration apparatus for detecting a failure in operating conditions of the information processing apparatus, and a power supply control unit that controls power supply of the supply circuit on the basis of a power supply on/off instruction received from the administration apparatus via the network connecting unit.

5 Claims, 5 Drawing Sheets

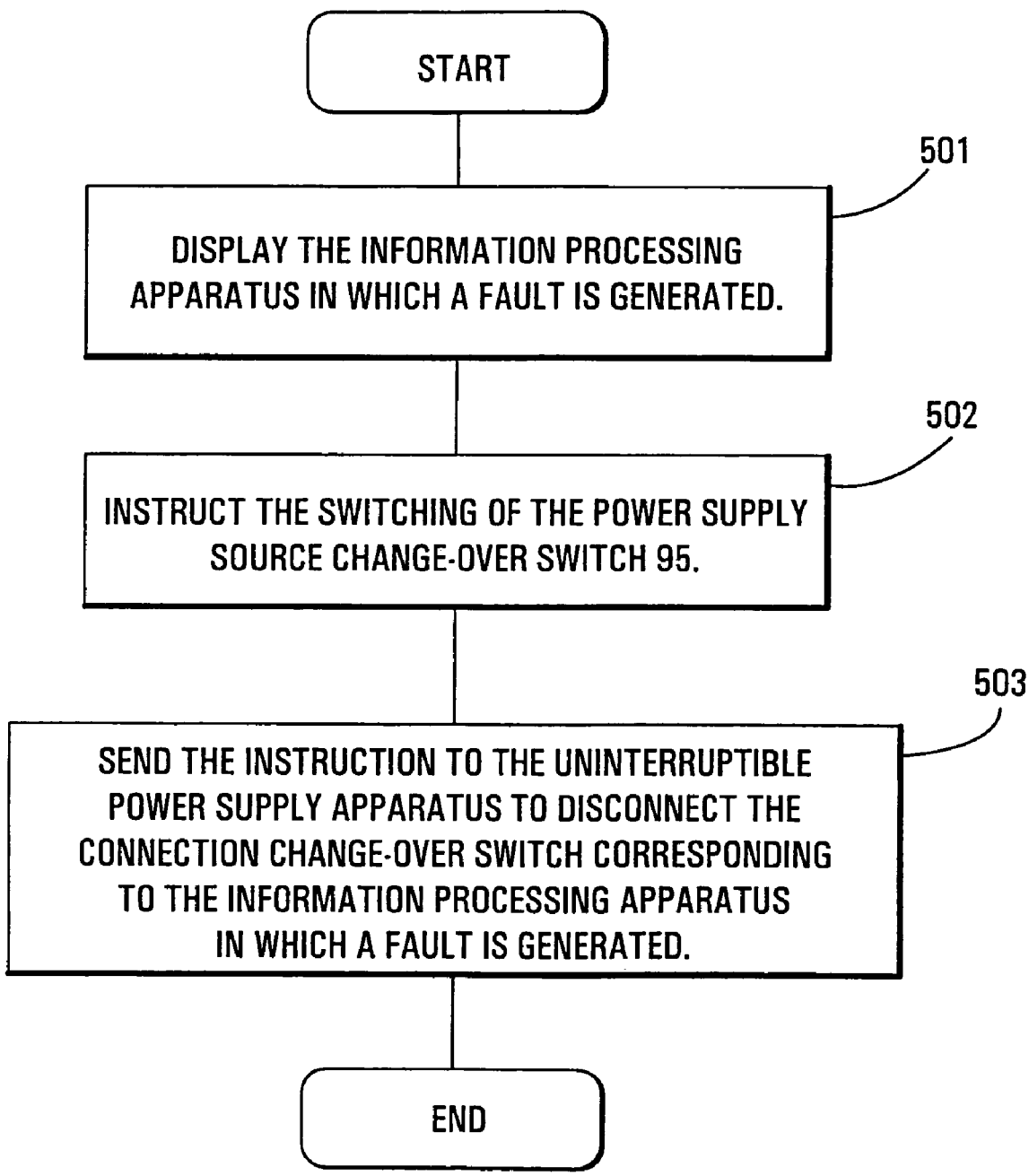

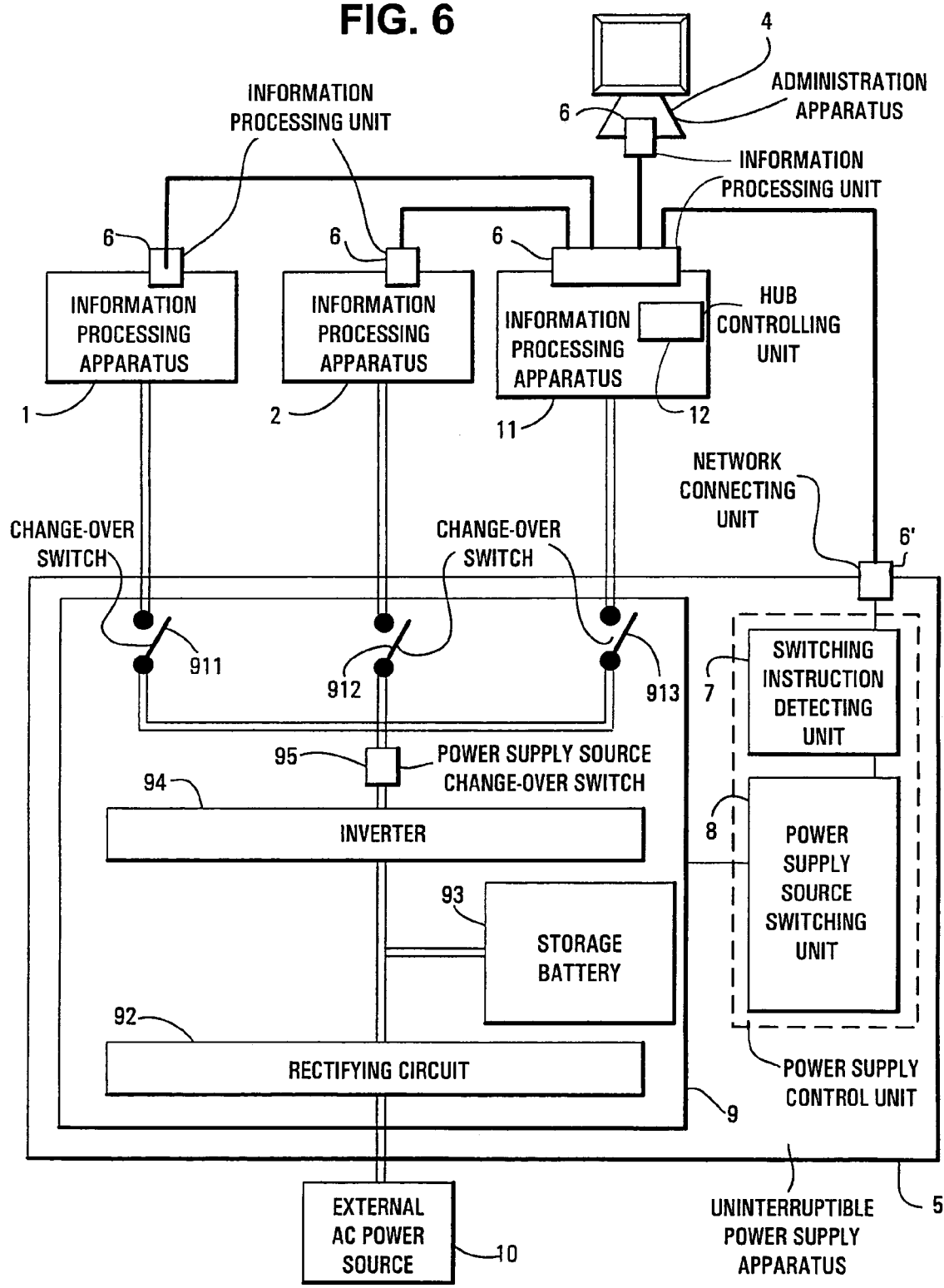

POWER SUPPLY CONTROL APPARATUS, POWER SUPPLY CONTROL SYSTEM, AND ADMINISTRATION APPARATUS

CROSS-REFERENCE TO RELATED APPLICATION

This application is related to and claims priority to Japanese Application No. 2003-428918 filed Dec. 25, 2003 in the Japanese Patent Office, the contents of which are incorporated by reference herein.

BACKGROUND OF THE INVENTION

1. Field of the Invention

The present invention is directed to a power supply control apparatus such as an uninterruptible power supply apparatus used in a system formed of at least one information processing apparatus.

2. Description of the Related Art

Almost all information processing apparatuses forming a network use a commercial power supply system. The most serious threat to these information processing apparatuses forming a network is a power failure.

A power failure may be caused by a blackout due to an operation mistake or a natural disaster. A momentary brown-out, a variation in voltage or a variation in frequency due to starting up a large information processing apparatus may become a cause of malfunction and missing data. In the worst case, such troubles result in breakdown of the operating system and stoppage of the network function.

In order to protect the functions of a large system (e.g. online banking system) and an information processing apparatus (e.g. a server) from such problems, an uninterruptible power supply apparatus continues to supply the stable electrical power to the system or the apparatus.

An uninterruptible power supply apparatus has a battery to supply power to the information processing apparatus in case a power failure occurs in a commercial power resource so that the information apparatus secures sufficient time to execute safety power off. Therefore, it has had widespread use mainly for back-up of information processing apparatuses in systems such as the online banking systems.

Recently, with progress in high performance and down-sizing of the information processing apparatus, the spread of personal computers and workstations and the expansion of networks, demand for a convenient uninterruptible power supply apparatus has increased.

Conventional examples using an uninterruptible power supply apparatus in a system formed of a plurality of electronic apparatuses such as a plurality of information processing apparatuses are illustrated in FIG. 1.

A first prior art system illustrated in FIG. 1 is formed of information processing apparatuses 1, 2, 3 provided with a network connecting unit 6 and an administration apparatus 4. The information processing apparatuses 1, 2, 3 are supplied power from an uninterruptible power supply apparatus 5 connected to an external AC power source 10.

In FIG. 1, a thick black line indicates a network, while a double line indicates a power supply line. The information processing apparatuses 1, 2, 3 are each provided with a power supply control program for monitoring the operating condition of each information processing apparatus and for executing a disconnection of the power supply from the uninterruptible power supply apparatus 5 in compliance with an instruction from the administration apparatus 4.

The administration apparatus 4 is provided with a power supply control program for displaying the operating conditions of the information processing apparatuses 1, 2, 3 by using a monitor and for instructing a disconnection of the power supply to one of the information processing apparatuses 1, 2, 3 in compliance with a failure in the operating condition of the corresponding one of the information processing apparatuses 1, 2, 3.

For example, in the information processing apparatus 1, if a fault occurs in the hardware due to a power failure or an application failure, the occurrence of a fault is notified to the administration apparatus 4 from the power supply control program within the information processing apparatus 1. After the administration apparatus 4 is notified of a fault, an operator causes the administration apparatus 4 to send a disconnecting instruction to the information processing apparatus 1 to cause the information processing apparatus 1 to execute a disconnection of the power supply from the uninterruptible power supply apparatus 5.

In a second prior art system illustrated in FIG. 2, the power supply control units 100, 200, 300 provided in the information processing apparatuses 1, 2, 3 execute on/off control of the power supply from the uninterruptible power supply apparatus 5.

The system of prior art FIG. 2 is constituted by the information processing apparatuses 1, 2, 3 provided with the network connecting units 6, the administration apparatus 4, and the uninterruptible power supply apparatus 5 connected to the external AC power source 10. The information processing apparatuses 1, 2, 3 are supplied with electrical power from the uninterruptible power supply apparatus 5.

In FIG. 2, a black thick line indicates the network, while a double line indicates the power supply line. The information processing apparatuses 1, 2, 3 are provided with power supply control units 100, 200, 300 which monitor the operating conditions of the information processing apparatus and execute disconnection of the power supply from the uninterruptible power supply apparatus 5 in compliance with an instruction from the administration apparatus 4.

The administration apparatus 4 is provided with a power supply control program for displaying the operating conditions of the information processing apparatuses 1, 2, 3 using a monitor, and instructing disconnection of the power supply to the information processing apparatuses 1, 2, 3 in compliance with a fault in the operating condition of the information processing apparatuses 1, 2, 3.

For example, a fault may be generated in the hardware or in the application due to a power failure in the information processing apparatus 1. Occurrence of a fault is notified to the administration apparatus 4 from the power supply control units 100, 200, 300 in the information processing apparatus 1. After the administration apparatus 4 is notified of a fault, an operator causes the administration apparatus 4 to send a disconnecting instruction to the information apparatus 1 to cause the power supply control unit 100 to execute disconnection of the power supply from the uninterruptible power supply apparatus 5.

Japanese Patent Application Laid-Open No. Hei 10(1998)-51979 discloses executing control of power supplied to a computer from an uninterruptible power supply apparatus by exchange of control information between the uninterruptible power supply apparatus and the computer via a communication packet.

However, in the prior art illustrated in FIG. 1 and the prior art of the above described Japanese patent application, a function and software to disconnect the power supply are required for each individual information processing apparatus.

Moreover, since the power supply control for the information processing apparatus is executed by the software, if a fault is generated in which the application falls into a loop, it is no longer possible to receive the instruction from the administration apparatus to disconnect the power supply.

Further, in the prior art illustrated in FIG. 2, the uninterruptible power supply apparatus has an increased cost because specific hardware to disconnect the power supply via the network and to monitor a fault, is required for the each information processing apparatus.

SUMMARY OF THE INVENTION

An aspect of the present invention is to surely and economically realize power supply control of a plurality of information processing apparatuses without relation to the intrinsic function of the information processing apparatus and the network.

To achieve the above mentioned aspect, the present invention includes a power supply control apparatus connected with at least one information processing apparatus comprising a supply circuit that supplies electrical power to the information processing apparatus, a network connecting unit that connects a network with an administration apparatus for detecting a failure in operating conditions of the information processing apparatus, and a power supply control unit that controls power supply of the supply circuit on the basis of a power supply on/off instruction received from the administration apparatus via the network connecting unit.

Moreover, the present invention includes a power supply control apparatus comprising a power supply switch controlled with the power supply control unit for on/off operations in compliance with the power supply on/off instruction from the administration apparatus.

Moreover, the present invention includes a computer-readable medium storing a program which, when executed by an administration apparatus connected with a power supply control apparatus through a network, causes the administration apparatus to perform operations comprising, detecting a failure in the operating condition of at least one information processing apparatus, and sending a power off instruction to the power supply control apparatus to cause the power supply control apparatus to disconnect the power supply to the failed information processing apparatus.

Moreover, the present invention includes A power supply control method for at least one information processing apparatus comprising, detecting a failure in the operating condition of at least one information processing apparatus, and sending power off instruction to the power supply apparatus to make the power supply control apparatus to disconnect the power supply to the failed information processing apparatus.

In the present invention, the power supply control of the information processing apparatus is executed by a power supply control apparatus such as an uninterruptible power supply apparatus connected to the administration apparatus through the network. Therefore, even if the application of the information processing apparatus falls into a loop, disconnection of the power supply of the information processing apparatus can be executed by the uninterruptible power supply apparatus.

Moreover, it is no longer required to mount hardware having a monitoring function and a power supply controlling function such as the power supply control unit, in the information processing apparatus.

In addition, since the power supply control and monitoring condition in the present invention is not controlled by the program executed in the information processing apparatus, the power supply control of a plurality of information processing apparatuses can surely be performed at a lower cost without relation to a function of the information processing apparatus itself.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a flowchart illustrating the operation of the administration apparatus 14 in FIG. 3.

FIG. 6 is a block diagram of the uninterruptible power supply system in accordance with an alternate embodiment of the present invention.

DETAILED DESCRIPTION OF THE PREFERRED EMBODIMENTS

The present invention is described in detail below with reference to the drawings.

Figure 1:
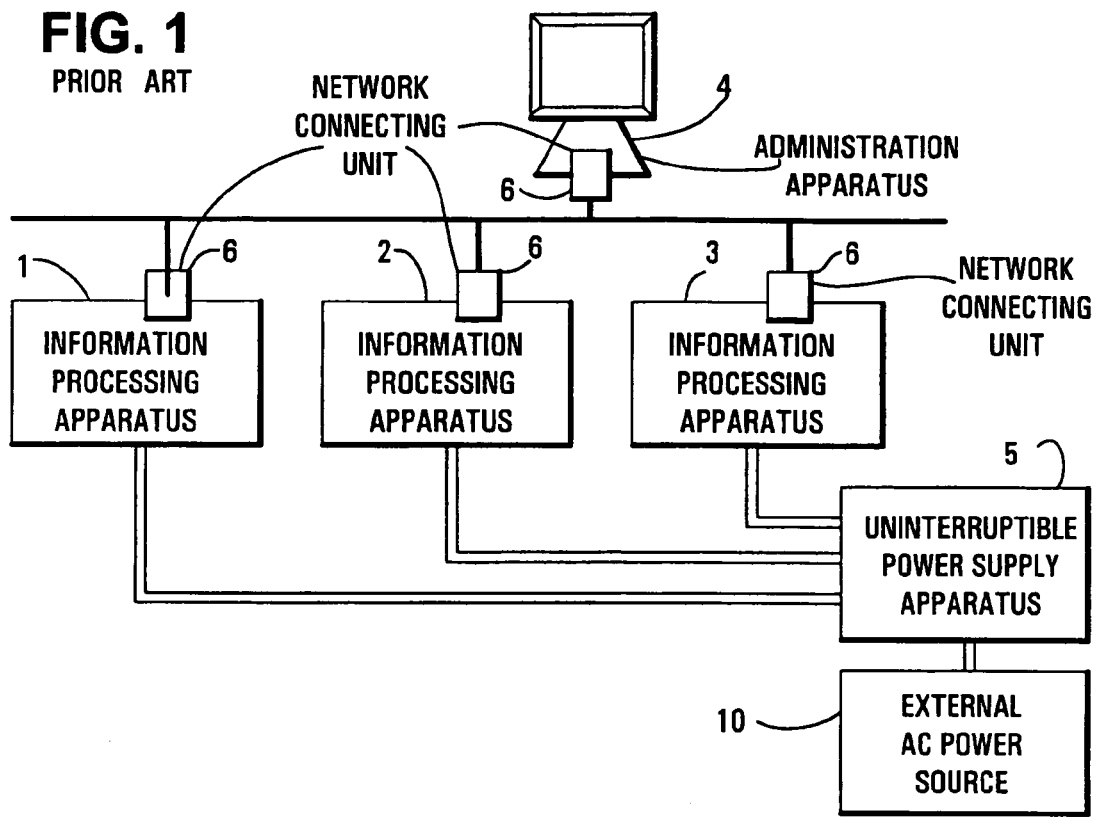
FIG. 1 is a block diagram of a conventional uninterruptible power supply system for disconnecting a power supply via a program on the information processing apparatus.
Figure 2:
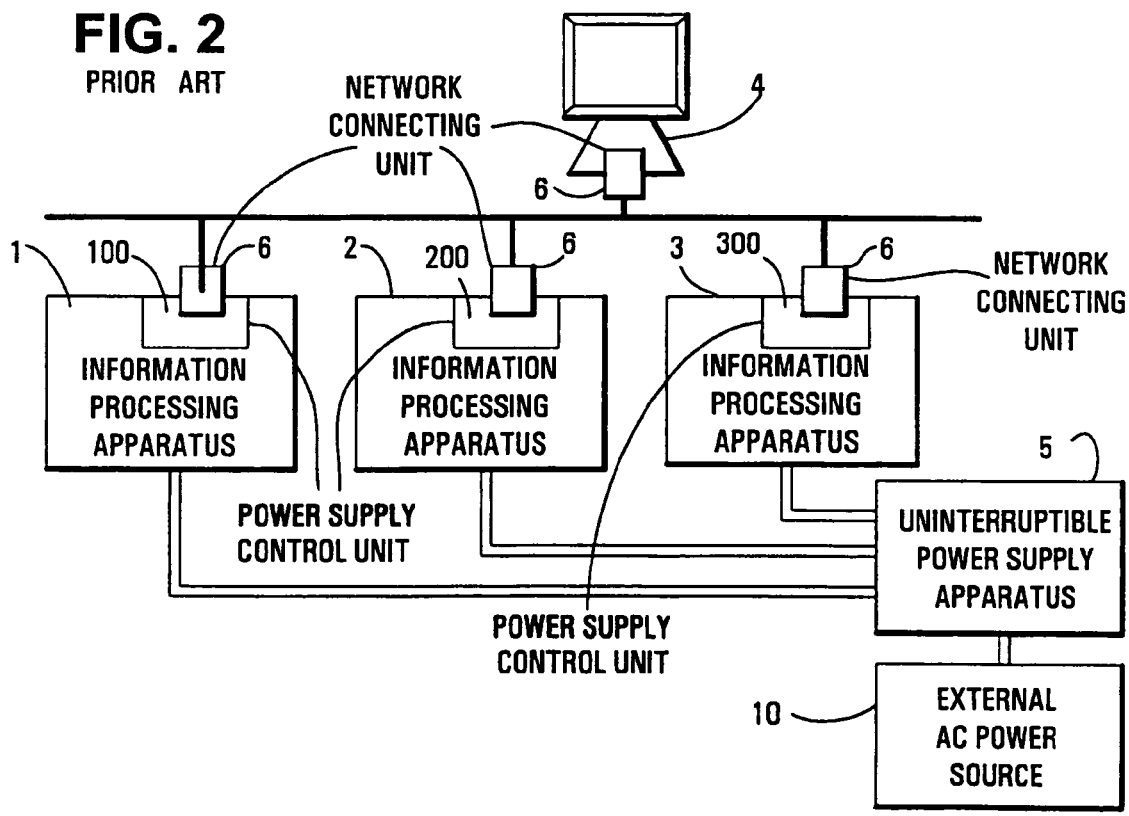
FIG. 2 is a block diagram of a conventional uninterruptible power supply system for disconnecting a power supply via a power supply control unit on the processing apparatus.
Figure 3:
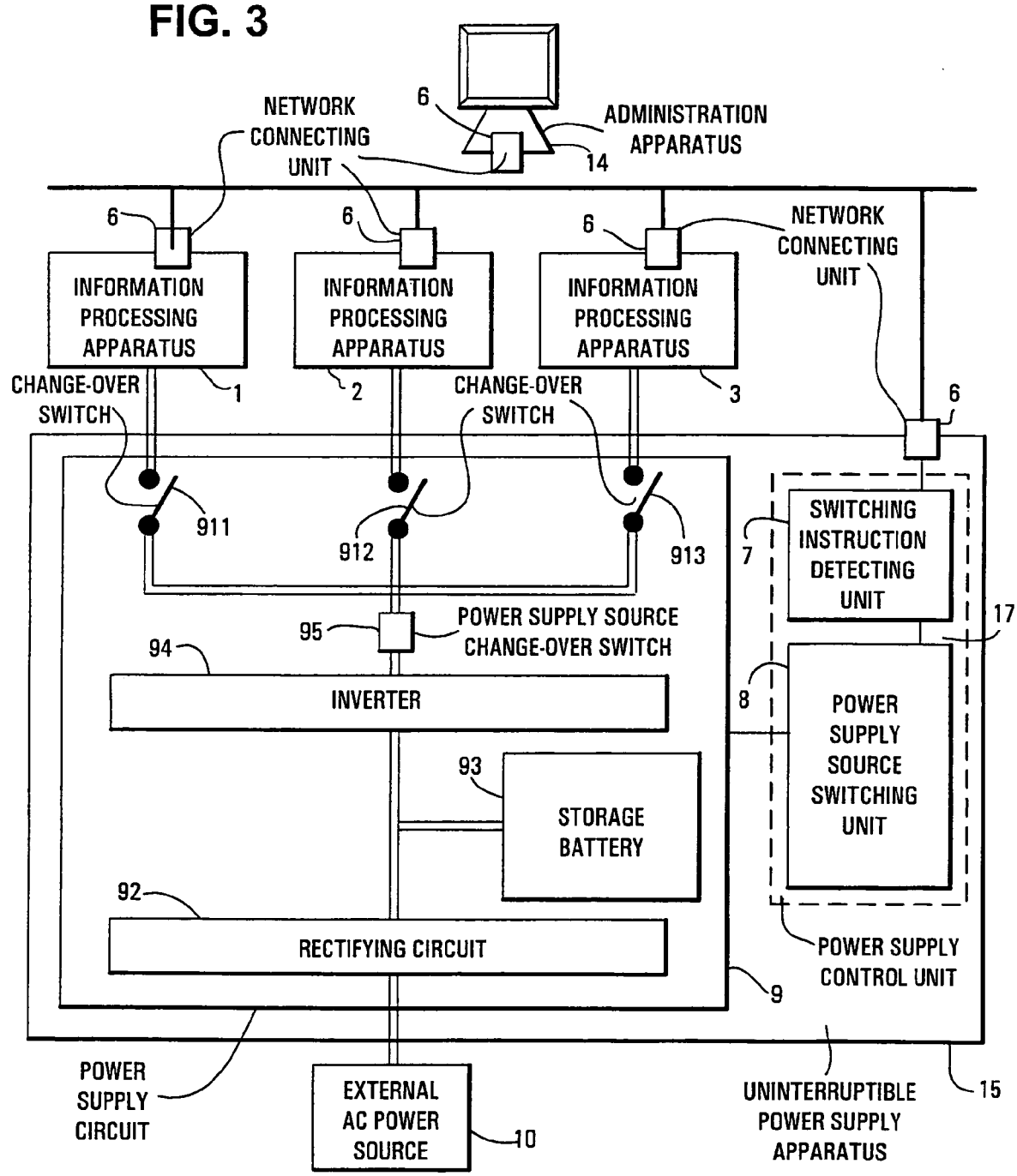
FIG. 3 is a block diagram of an uninterruptible power supply system in accordance with an embodiment of the present invention.

FIG. 3 is a block diagram of an uninterruptible power supply apparatus (as a power supply control apparatus) in accordance with the preferred embodiment of the present invention. In FIG. 3, the reference numerals 1, 2, 3 designate information processing apparatus; 14, an administration apparatus; and 15, an uninterruptible power supply apparatus. Also, a black thick line indicates a network and a double line indicates an electrical power supply line.

The uninterruptible power supply apparatus 15 comprises a network connecting unit 6', a power supply control unit 17 and a power supply circuit 9. The power supply control unit 17 comprises a switching instruction detecting unit 7 and a power supply source switching unit 8.

The electrical power supply circuit 9 comprises change-over switches 911, 912, 913 for switching between ON and OFF conditions based on the output of the power supply source switching unit 8, a rectifying circuit 92 for converting an external AC power source 10 to a DC power source, a storage battery 93 for supplying electrical power if the power supply from the external AC power source 10 is disrupted, an inverter 94 for converting a DC current to an AC current and a power supply source change-over switch 95.

The administration apparatus 14 is connected to the information processing apparatuses 1, 2, 3 using respective network connecting units 6, and an uninterruptible power supply apparatus 15 is connected to the administration apparatus 14 through the network connecting unit 6' in the present invention.

The administration apparatus 14 also comprises, although not illustrated in the figure, a storage unit for storing an operating program, a memory for developing the program and a central processing unit (CPU) for operating the program, in addition to the network connecting unit 6.

The information processing apparatuses 1, 2, 3 are connected, for the purpose of receiving the electrical power, to the uninterruptible power supply apparatus 15 which extracts the electrical power from the external AC power source 10. The information processing apparatuses 1, 2, 3 are provided with an operating condition monitoring program for monitoring the operating conditions thereof.

The administration apparatus 14 is provided with a monitoring program for monitoring the operating conditions of the information processing apparatuses 1, 2, 3 (for example, executing a ping command) and a power supply instruction program for instructing the ON and OFF conditions of the connection change-over switches 911, 912, 913 of the uninterruptible power supply apparatus 15.

Here, the ping command is used for searching for a response condition and response rate of the information processing apparatuses 1, 2, 3, depending on the return of answer after arrival of packets to the information processing apparatuses 1, 2, 3 as the transmission destination.

While the uninterruptible power supply system illustrated in FIG. 3 is operating, the uninterruptible power supply apparatus 15 fetches electrical power from the external AC power source 10 and converts the AC current to the DC current using the rectifying circuit 92 to store the electric power in the storage battery 93. The AC current converted from DC current by inverter 94 is supplied to the information processing apparatuses 1, 2, 3.

When a hardware failure or an application failure due to power failure of the external AC power source are detected with the operating condition monitoring program installed in the information processing apparatus 1, the administration apparatus 14 receives such failure information from the information processing apparatus 1 and displays this information on a monitor of administration apparatus 14. Also, when no response to the request from the administration apparatus 14 due to power failure of the external AC power source is detected by the monitoring program installed in the administration apparatus 14, the administration apparatus 14 displays this information on the monitor of administration apparatus 14.

The administration apparatus 14 transmits, to the uninterruptible power supply apparatus 15, a switching instruction for the power supply source change-over switch 95 to change the power supply resource into storage battery 93, and a disconnect instruction for the change-over switch 911 to disconnect the power supply to the information processing apparatus 1 in accordance with the power supply instruction program.

The switching instruction detecting unit 7 transmits, to the power supply source switching unit 8, the switching signal of the power supply source change-over switch 95 and the signal for disconnecting the connection change-over switch 911. After the electrical power supply source is switched to the storage battery and the information processing apparatus 1 shuts off operation, the connection change-over switch 911 is disconnected and thereby the power supply to the information processing apparatus 1 is stopped.

When the electrical power of the external AC power source 10 is recovered, the administration apparatus 14 transmits, to the switching instruction detecting unit 7, an instruction for connecting (closing) the connection change-over switch of the uninterruptible power supply apparatus 15 with a program for instructing the ON and OFF conditions of the connection change-over switch 911. The switching instruction detecting unit 7 transmits the signal for connecting the connection change-over switch 911 to the power supply source switching unit 8 to connect the connection change-over switch 911, while the uninterruptible power supply apparatus 15 re-starts the power supply to the information processing apparatus 1. Moreover, when the power supply is started again, the information processing apparatus 1 is re-started with an automatic restarting program.

If a power failure occurs, as described above, in the external AC power source 10, the administration apparatus 14 is capable of providing power supply control of the information processing apparatuses 1, 2, 3. This is done by transmitting, to the switching instruction detecting unit 7, the instruction for ON and OFF conditions of the connection change-over switches 911, 912, 913 for controlling the power supply of the information processing apparatuses 1, 2, 3, and then controlling the power supply switching unit 8 to perform the connection switching of the connection change-over switches 911, 912, 913 with the instruction for the ON and OFF conditions.

With the operations described above, the power supply operation of the uninterruptible power supply apparatus 15 can be controlled without relation to the functions of the information processing apparatuses 1,2,3 connected to the uninterruptible power supply apparatus 15.

Figure 4:
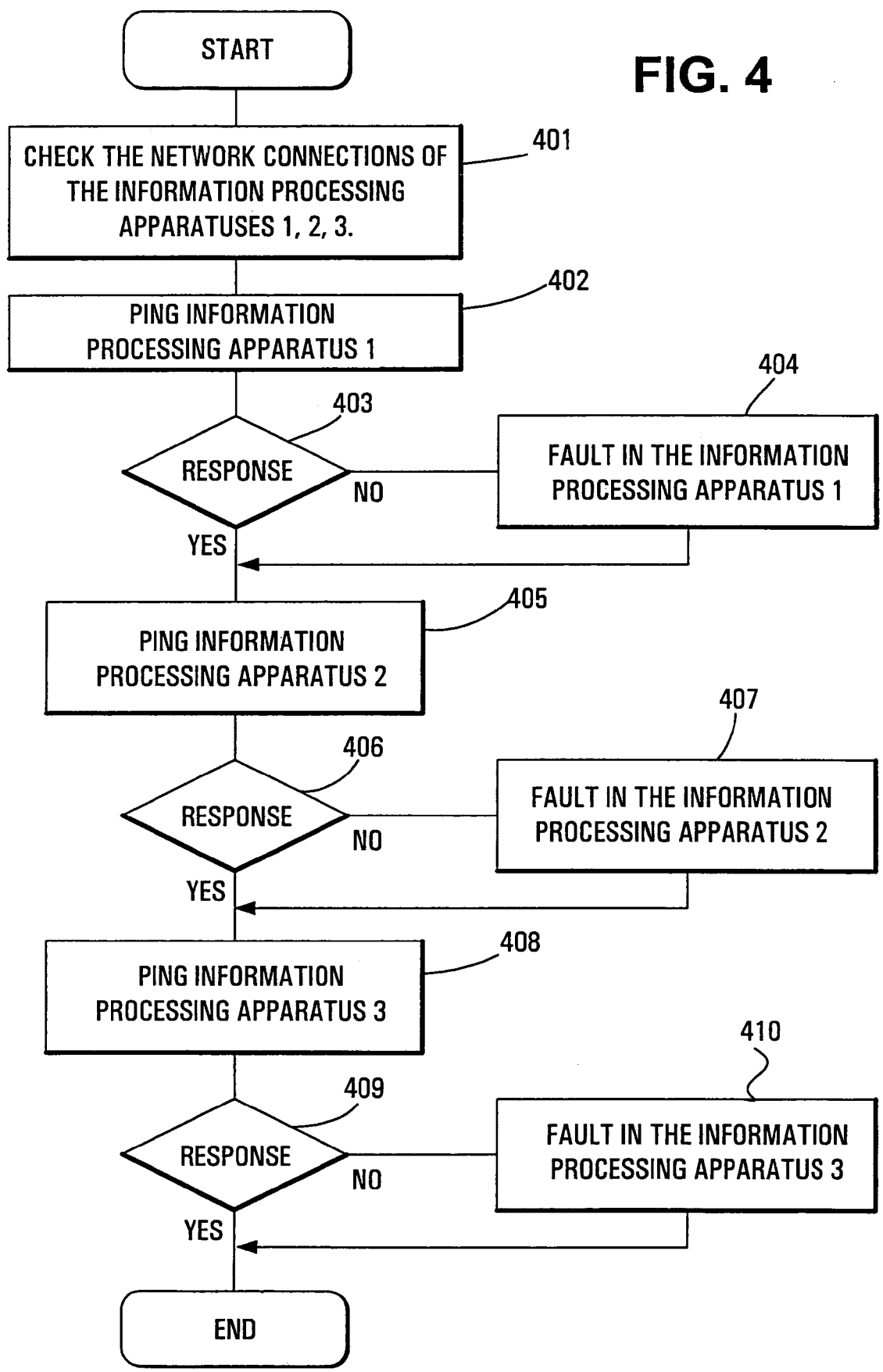
FIG. 4 is a flowchart illustrating the operation of the administration apparatus 14 in FIG. 3.

FIG. 4 and FIG. 5 are flowcharts illustrating the control performance by the administration apparatus 14 for the power supply of the uninterruptible power supply apparatus 15.

In FIG. 4, the administration apparatus 14 starts the monitoring of the information processing apparatuses 1, 2, 3. The administration apparatus 14 confirms whether the information processing apparatuses 1, 2, 3 are connected to the network or not (operation 401). Thereafter, the administration apparatus 14 transmits packets to the information processing apparatus 1 with the ping command (operation 402).

If a response is not returned upon determination of the response of the information processing apparatus 1 for the ping command (operation 403), it is recognized that a failure is occurring in the information processing apparatus 1 (operation 404) and the ping command is transmitted to the information processing apparatus 2 (operation 405). If a response is returned upon determination of the response of the information processing apparatus 1 for the ping command (operation 403), it is recognized that the information processing apparatus 1 is normal and the ping command is transmitted to the information processing apparatus 2 (operation 405).

In the same manner, if a response is not returned upon determination of the response of the information processing apparatus 2 for the ping command (operation 406), it is recognized that a failure is occurring in the information processing apparatus 2 (operation 407) and the ping command is transmitted to the information processing apparatus 3 (operation 408). If a response is returned upon determination of the response of the information processing apparatus 1 for the ping command (operation 406), it is recognized that the information processing apparatus 2 is normal and the ping command is transmitted to the information processing apparatus 2 (operation 408). If a response is not returned upon determination of the response of the information processing apparatus 3 for the ping command (operation 409), it is recognized that a failure is occurring in the information processing apparatus 3 (operation 410). If a response is returned upon determination of the response of the information processing apparatus 3 for the ping command (operation 409), it is recognized that the information processing apparatus 3 is normal.

Next, in FIG. 5, the administration apparatus 14 starts issuing an instruction for disconnecting the power supply of the information processing apparatus in which a failure occurs. The administration apparatus 14 displays the identification (ID) number (for example, IP address) or the like of the information processing apparatus for which the response of the ping command is not returned indicating occurrence of a failure in the flowchart of FIG. 4 (operation 501). An instruction for switching the power supply change-over switch 95 is issued (operation 502). An instruction is issued for disconnecting the connection change-over switch (911, 912 or 913) corresponding to the information processing apparatus in which a failure is detected is issued (operation 503).

Accordingly, when a failure is generated in the information processing apparatus connected to the uninterruptible power supply apparatus 15, the power supply by the uninterruptible power supply apparatus 15 can be controlled without relation to the functions of the information processing apparatus.

Referring to the alternate embodiment of FIG. 6, the reference numerals 1, 2 designate the information processing apparatuses; 11, a HUB; 14, the administration apparatus; and 15, the uninterruptible power supply apparatus. In FIG. 6, a black thick line indicates a network and a double line indicates an electrical power supply line. The uninterruptible power supply apparatus 15 comprises a network connecting unit 6', a power supply control unit 17 and a power supply circuit 9. The power supply control unit 17 comprises a switching instruction detecting unit 7 and a power supply source switching unit 8.

The electrical power supply circuit 9 comprises change-over switches 911, 912, 913 for switching between ON and OFF conditions based on the output of the power supply source switching unit 8, a rectifying circuit 92 for converting an external AC power source 10 to a DC power source, a storage battery 93 for supplying electrical power if the power supply from the external AC power source 10 is disrupted, an inverter 94 for converting a DC current to an AC current and a power supply source change-over switch 95.

The HUB 11 is connected to the network using the information processing apparatuses 1, 2, administration apparatus 14, uninterruptible power supply apparatus 15 and respective network connecting units 6. The administration apparatus 14 transmits the instruction for disconnecting (opening) the connection change-over switch 913 to the switching instruction detecting unit 7 via the HUB controlling unit 12 within the HUB using the power supply instruction program for instructing ON and OFF conditions of the connection change-over switch 913.

The switching instruction detecting unit 7 transmits the signal for disconnecting the connection change-over switch 913, to the power supply source switching unit 8. Thereby, the connection change-over switch 913 is disconnected and the power supply to the HUB 11 is stopped.

Generally, HUB 11 is capable of remotely executing various settings and updating its firmware via the network. However, the reset operation (by power source OFF/ON) is required to enable new settings or new firmware. Accordingly, in addition to the reset when a failure occurs as described above, various setting and updating or the like can be completed from the remote areas.

Next, examples of modifications to the embodiment of the uninterruptible power supply apparatus of the present invention and the other technical extended items will be described below.

In the above embodiment, three information processing apparatuses are connected to the uninterruptible power supply apparatus, but the number of information processing apparatuses is not limited to three units. It is also possible that three or more apparatuses may be connected, or only one apparatus may also be connected to the uninterruptible power supply apparatus.

Also, the power supply circuit described above may be alternated to others such as a line interactive power supply system or a permanent inverter power supply system.

In the above embodiment, an AC power source is used as the external power source but this external power source is not limited to an AC power source, and an external DC current may also be employed.

In the above embodiment, operations of the uninterruptible power supply system have been described in which a hardware failure or an application failure is generated in the information processing apparatus 1 or in which no response is returned to the request from the administration apparatus 14. However, such operations are not limited only to the failure of information processing apparatus 1, but can also be applied to the information processing apparatus 2 or 3.

In the above embodiment, the power supply for the information processing apparatus 1 has been switched to the storage battery 93 in order to stop the power supply described above. However, it is not always required to switch the change-over switch 95, and the electrical power of the external AC power source 10 may be suspended without switching to the storage battery 93.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system controlling power supply to at least one information processing apparatus connected to a network, comprising;

an administration apparatus connected to the at least one information processing apparatus via the network, the administration apparatus transmitting first packets to the at least one information processing apparatus, detecting a failure in operating conditions of the at least one information processing apparatus in accordance with a response status for second packets from the at least one information processing apparatus and sending a power-off instruction; and a power supply control apparatus receiving the power-off instruction and connected to the at least one information processing apparatus via the network, the power supply control apparatus supplying electrical power to the at least one information processing apparatus and controlling a power supply of a supply circuit on the basis of the power-off instruction from the administration apparatus via the network.

2. A computer-readable medium storing a program which, when executed by an administration apparatus connected to a power supply control apparatus via a network, causes the administration apparatus to perform operations comprising:

transmitting first packets to at least one information processing apparatus;

detecting a failure in the operating condition of the at least one information processing apparatus in accordance with a response status for second packets from the at least one information processing apparatus; and sending a power off instruction to the power supply control apparatus to cause the power supply control apparatus to disconnect a power supply to the failed information processing apparatus.

3. The computer-readable medium according to claim 2, further comprising:

sending a power on instruction to the power supply control apparatus to cause the power supply control apparatus to connect the power supply to the failed information processing apparatus after sending the power off instruction.

4. A power supply control method for at least one information processing apparatus, comprising:

transmitting first packets to the at least one information processing apparatus;

detecting a failure in the operating condition of the at least one information processing apparatus in accordance with a response status for second packets from the at least one information processing apparatus; and sending a power off instruction to a power supply control apparatus to cause the power supply control apparatus to disconnect a power supply to the failed information processing apparatus.

5. An administration apparatus connected to a power supply control apparatus and to an information processing apparatus through a network, comprising:

a program module transmitting first packets to the information processing apparatus and detecting a failure in operating conditions of the information processing apparatus in accordance with a response status for second packets from the information processing apparatus and sending a power off instruction to the power supply control apparatus to cause the power supply control apparatus to cutoff a power supply to the failed information processing apparatus.

\* \* \* \* \*